United States Patent [19]
Weil et al.

[11] 4,186,657
[45] Feb. 5, 1980

[54] APPARATUS FOR SHEARING SPENT NUCLEAR FUEL ASSEMBLIES

[75] Inventors: Bradley S. Weil; Curtis F. Metz, III, both of Knoxville, Tenn.

[73] Assignee: The United States of America as represented by the United States Department of Energy, Washington, D.C.

[21] Appl. No.: 967,469

[22] Filed: Dec. 7, 1978

[51] Int. Cl.² .............................................. B30B 13/00
[52] U.S. Cl. ....................................... 100/39; 100/95; 100/295; 72/326; 72/334; 83/580; 83/694
[58] Field of Search ...................... 100/35, 39, 42, 232, 100/95–98, 295; 72/324, 326, 334, 338; 83/580, 694, 48

[56] References Cited
U.S. PATENT DOCUMENTS

| | | | |
|---|---|---|---|
| 1,424,005 | 7/1922 | Drury | 83/694 X |
| 3,763,770 | 10/1973 | Ehrman et al. | 100/39 |
| 4,056,052 | 11/1977 | Weil et al. | 100/39 |

Primary Examiner—Peter Feldman
Attorney, Agent, or Firm—R. V. Lupo; Stephen D. Hamel

[57] ABSTRACT

A method and apparatus are described for shearing spent nuclear fuel assemblies of the type comprising an array of fuel pins disposed within an outer metal shell or shroud. A spent fuel assembly is first compacted in a known manner and then incrementally sheared using fixed and movable shear blades having matched laterally projecting teeth which slidably intermesh to provide the desired shearing action. Incremental advancement of the fuel assembly after each shear cycle is limited to a distance corresponding to the lateral projection of the teeth to ensure fuel assembly breakup into small uniform segments which are amenable to remote chemical processing.

5 Claims, 2 Drawing Figures

APPARATUS FOR SHEARING SPENT NUCLEAR FUEL ASSEMBLIES

BACKGROUND OF THE INVENTION

The invention relates generally to the reprocessing of spent nuclear fuel assemblies and, more particularly, to a method and apparatus for shearing spent nuclear fuel assemblies of the type comprising an array of elongated fuel pins disposed within an outer metal shroud. It was made in the course of, or under, a contract with the United States Department of Energy.

Reprocessing of spent fuel assemblies from boiling water reactors (BWR) and pressurized water reactors (PWR) to recover fuel values is accomplished by a process known as the shear-leach process wherein the fuel assemblies are sheared or cut into short segments and the recoverable fissile and fertile materals leached out of the sheared segments with nitric acid. Apparatus to accomplish the shearing part of the shear-leach process is generally known as a fuel-bundle shear. Although fuel-bundle shears have been developed and routinely used in connection with the reprocessing of BWR and PWR fuel assemblies, fuel assemblies developed for use in the liquid metal fast breeder reactor (LMFBR) present special problems in connection with the shearing operation. For example, fuel assemblies used in the LMFBR use a heavy 0.120-inch thick stainless steel shroud to provide a channel for the sodium coolant and to act as a support structure for the fuel pins while 0.031-inch thick shrouds are found in PWR and BWR reactors. Such heavy shrouds are more difficult to shear and can cause disruptions in post-shear processing if not uniformly sheared into small uniform pieces. In addition, spent LMFBR fuels will display higher radioactivity and decay heat emission than spent fuels from conventional pressurized water and boiling water reactors and will require the highest degree of system reliability throughout remotely operated fuel reprocessing operations.

These and other unique problems associated with the fuel assemblies used in the LMFBR require that the product from the shearing mechanism be small and uniform to avoid blockage during subsequent chemical processing.

It is, accordingly, a general object of the invention to provide a method and apparatus for shearing spent fuel assemblies which yield uniform sheared segments of relatively small size.

Another object of the invention is to provide a method and apparatus suitable for shearing LMFBR fuel assemblies having a heavy shroud.

Other objects of the invention will be apparent upon examination of the following written description of a preferred embodiment of the invention and the accompanying drawings.

SUMMARY OF THE INVENTION

A method and apparatus are provided for shearing spent nuclear fuel assemblies having a heavy outer shroud into relatively small uniform segments for the purpose of subsequent recovery of fuel values therefrom. A spent fuel assembly is first compacted and then incrementally sheared using fixed and movable shear blades. The shear blades are provided with matched laterally projecting teeth which slidably intermesh to provide the desired shearing action. The compacted fuel assembly is moved incrementally through the shearing apparatus with each incremental advance being limited to a distance corresponding to the lateral projection of the teeth to ensure breakup of the fuel assembly into small uniform segments.

DESCRIPTION OF THE PREFERRED EMBODIMENT

Figure 1:
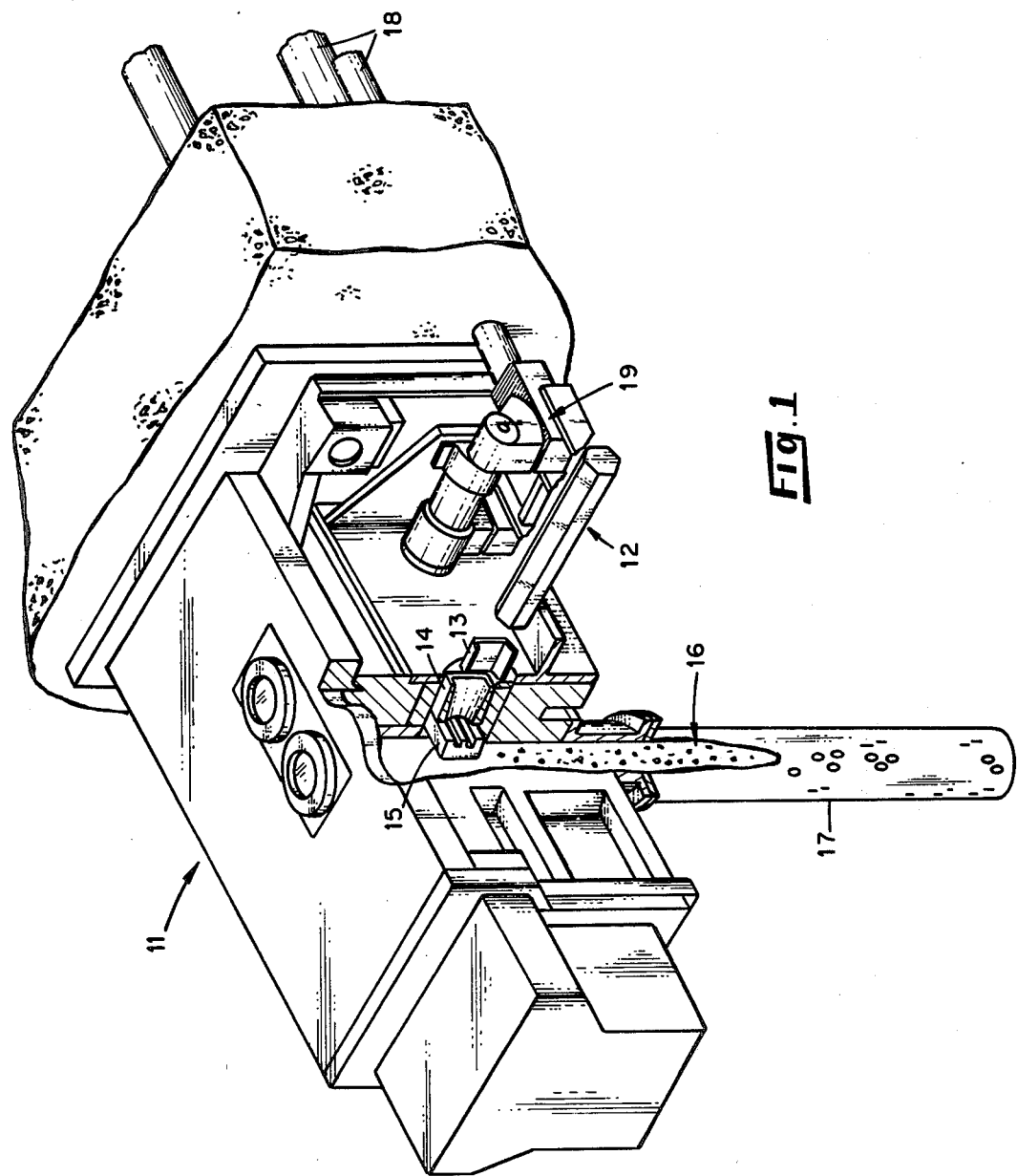
FIG. 1 is a perspective view, partially cut away, of shearing apparatus utilizing shearing blades made in accordance with the invention.

Turning now to the drawings, initially to FIG. 1, a fuel assembly shearing apparatus 11 is shown receiving a fuel assembly 12 of the shrouded pin-type used in the LMFBR for the purpose of shearing that assembly into small uniform segments suitable for subsequent chemical dissolution. As shown, the fuel assembly is inserted through a suitable port 13, compressed through the action of suitable gags 14 (only 1 shown) and then segmented using a moving shear blade 15 and a fixed shear blade (not shown) which are described in detail in later reference to FIG. 2. The sheared segments of the fuel assembly drop through a vertical passageway 16 into a perforated basket 17 positioned below the shear apparatus for subsequent chemical processing including leaching of nuclear fuel values from the fuel cladding, spacers, and shroud segments. Rods 18 drive rack and pinion assemblies 19 which, in turn, drive gags 14 and moving shear blade 15 to accomplish the abovedescribed compacting and shearing operations. Alternatively, other arrangements such as a hydraulically actuated piston and cylinder could be used to provide the driving force for the gags and shear blades. Also, the gags and shear blades could be oriented to travel in the vertical rather than the horizontal direction without departing from the scope of the invention.

Figure 2:
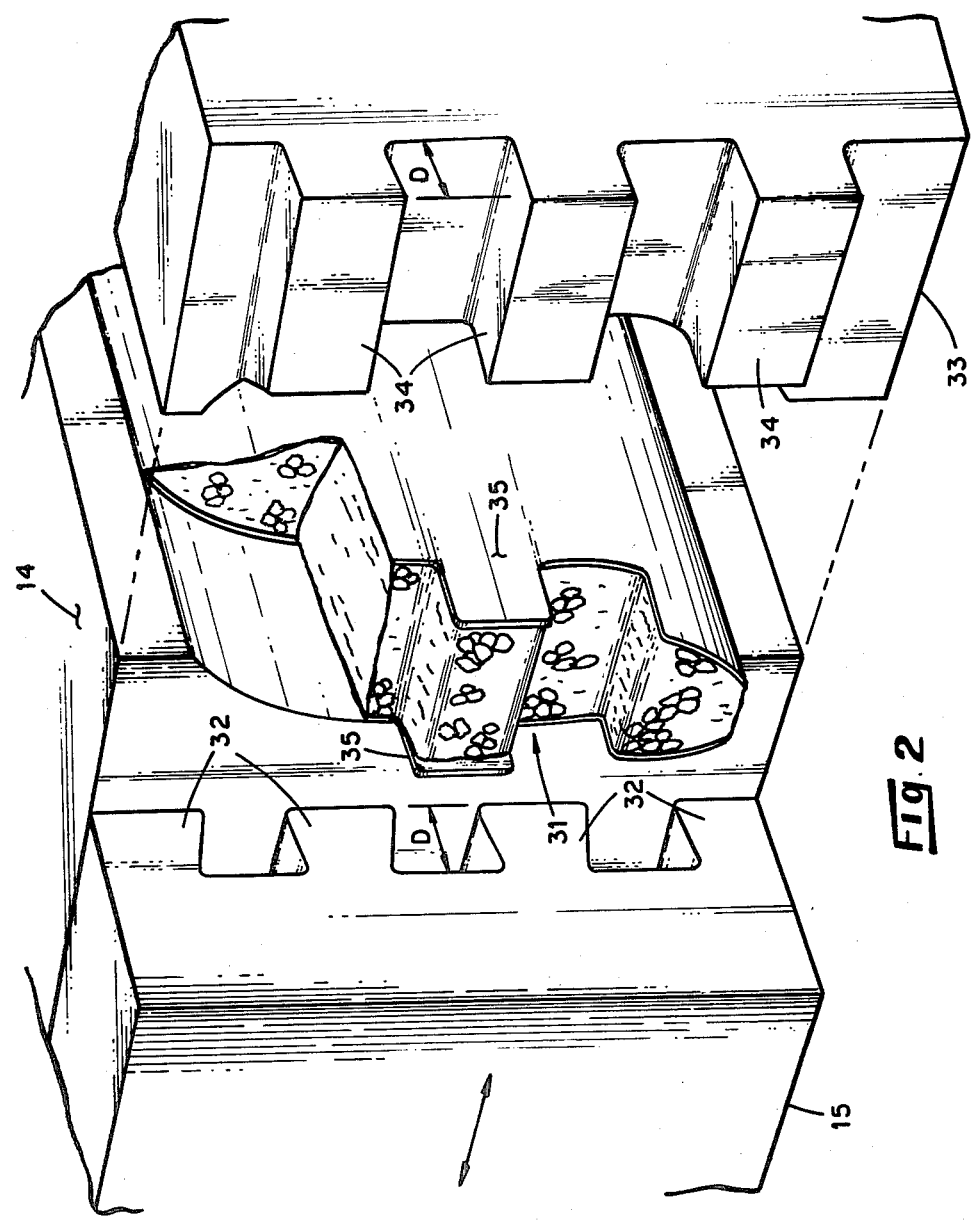
FIG. 2 is a perspective view illustrating fixed and movable shear blades made in accordance with the invention and including the sheared end of a compacted fuel assembly.

As shown in FIG. 2, the fuel assembly has been deformed through the action of stationary and movable gags into a compact 31 having an eliptic cross section with a cross sectional are which is about 50% of the original hexagonal cross sectional area of the fuel assembly. The operation of gags to produce compacts having various cross sections is well known in the fuel processing art. In this connection, reference is made to U.S. Pat. No. 4,056,052 issued Nov. 1, 1977 in the name of Bradley S. Weil et al, where the action of various gag configurations is described. The movable shear blade 15 shown in FIG. 2 is provided with a plurality of slightly dovetailed spaced-apart teeth 32 projecting laterally with respect to the direction of movement of that shear blade. A fixed shear blade 33 having spaced-apart teeth 34 which are displaced relative to teeth 31 of movable shear blade 15 in order to intermesh in a sliding contiguous relationship with the movable blade. The sliding action of the two blades produces a corresponding toothed cut through the compacted fuel assembly 31. After a shear cut has been completed, movable blade 15 is retracted to the position shown and the fuel assembly advanced a distance "D" corresponding to the depth of the teeth 32 and 34 of the respective shear blades. Subsequent passes by blade 15 shear the assembly into uniform segments with the shroud 35 of the compacted fuel assembly being segmented into small generally rectangular segments corresponding in size to the lateral cross section of teeth 32 and 34. The fuel assembly advancement and shearing steps are repeated until the entire fuel assembly is sheared into segments suitable for mechanical processing. By selecting the spacing and depth of the teeth 32 and 34, the fuel assembly cladding can be cut into small substantially square pieces which are suitable for further chemical processing. The slight dovetail configuration of teeth 32 minimizes interference and possible jamming of the shear blades during a shearing operation.

The above description of a preferred embodiment of the invention is provided for illustrative purposes only and should not be interpreted in a strictly limiting sense. For example, although the shearing blades and gag compactors were designed for processing shrouded fuel assemblies originally having a hexagonal cross section, the invention could easily be applied to shearing of fuel assemblies having rectangular or other cross sections as well. It is intended rather that the invention be limited in scope only by the appended claims.

What is claimed is:

1. A method for shearing spent nuclear fuel assemblies of the type including an array of fuel pins disposed within an outer metal shroud into small uniform segments for subsequent dissolution of contained fuel values comprising:
   (a) reducing the cross section of the fuel assembly by progressively pressing it between gags until it has a compressed end with a substantially reduced cross sectional area relative to the cross section of the uncompressed fuel assembly; and
   (b) shearing segments from the compressed end of said fuel assembly by driving a movable shearing blade against one side of said compressed end while maintaining a fixed shearing blade against the opposite side of said compressed end, said fixed and movable shearing blades each having a plurality of spaced-apart, laterally projecting, generally rectangular teeth which are displaced to intermesh in a sliding contiguous relationship during a shearing operation, said fuel assembly being advanced a distance equal to or less than the lateral projection of said teeth after each shearing operation.

2. The method of claim 1 wherein the cross section of said fuel asembly prior to compression is hexagonal, and wherein said fuel assembly is compressed into a compact having an eliptic cross section.

3. Apparatus for shearing spent nuclear fuel assemblies of the type including an array of fuel pins disposed within an outer metal shroud comprising:
   (a) means for laterally compressing said fuel assemblies into a compact having a generally eliptic cross section;
   (b) a fixed shearing blade for engaging one side of said compact, said fixed shearing blade having a plurality of first spaced-apart, laterally projecting, generally rectangular teeth; and
   (c) a movable shearing blade for engaging the other side of said compact having a plurality of second spaced-apart, laterally projecting, generally rectangular teeth, said second teeth being displaced relative to said first teeth so as to intermesh with said first teeth during a shearing operation.

4. The apparatus of claim 3 wherein said first teeth are dovetailed.

5. The apparatus of claim 3 wherein said fixed shearing blade is provided with a concave depression along its side which engages said compact with a contour which matches the contour of said compact.

* * * * *